March 8, 1932.    C. S. BRAGG ET AL    1,848,458
BRAKE SYSTEM FOR AUTOMOTIVE VEHICLES
Filed April 12, 1928    5 Sheets-Sheet 2

March 8, 1932.  C. S. BRAGG ET AL  1,848,458
BRAKE SYSTEM FOR AUTOMOTIVE VEHICLES
Filed April 12, 1928   5 Sheets-Sheet 5

Patented Mar. 8, 1932

1,848,458

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed April 12, 1928. Serial No. 269,486.

Our invention consists in the novel features hereinafter described, reference being had to the accompanying drawings which illustrate several embodiments of the same, selected by us for purposes of illustration, and the said invention is fully disclosed in the following description and claims.

In equipping automotive vehicles, and especially those of the heavier types, as trucks and buses, with brake mechanisms, it is customary to provide two separately and independently operable sets of brake mechanisms, usually for the wheels which carry the greater portion of the load, that is to say, usually the driven or non-steering wheels, one set of brake mechanisms being usually operated by a foot lever, and the other set being usually operated by a hand lever, or emergency brake lever. With the increase of load carrying capacity of automotive vehicles, especially trucks and buses, and improvements therein, such as pneumatic tires, which enable them to be operated at higher speeds, the conventional forms of automotive brake mechanisms are frequently inadequate and if applied with enough force to stop the vehicle, such force will injure and in some instances destroy the brake mechanisms by burning the brake linings or by tearing them from the brake shoes or bands, if said linings are of the woven type, or if harder or metallic brake linings are used, seriously cutting and abrading the brake linings or the brake drums, or if the brakes are of the internal expanding type, the brake drums may be expanded, or the connecting shafts or levers may be bent or twisted. Where separate brake mechanisms are operated independently by foot lever and hand lever, it is often difficult to secure the simultaneous application of both sets of brake mechanisms, which may often be required to stop the vehicle, as this requires the operator to remove one hand from the steering wheel. In the application of power actuators to brake systems for automotive vehicles, it is obviously impossible to attempt to apply any brake mechanism with more power than the parts are designed or constructed to fully withstand, as otherwise injury to the brake mechanisms connected with the power actuator, or actuators, would inevitably result.

Our present invention consists in a brake system adapted especially for automotive vehicles having the load wheels, or driven wheels, equipped with two separately operable brake mechanisms. In carrying our invention into effect, according to one embodiment thereof, we connect one set of brake mechanisms, preferably the larger and more rugged of the two, with a power actuator, so constructed that its maximum power can be applied to the brake mechanisms connected therewith, without danger of injury to the brake mechanisms, and we may provide one controlling valve mechanism for the said actuator in the connections between an operator operated part, as the foot lever, and the other of said independently operable brake mechanisms, which may be smaller, or of less rugged character, said connections providing a sufficient amount of lost motion to insure the operation of the valve mechanism. We may also provide the said power actuator for the heavier brake mechanisms with a second valve mechanism connected to the other operator operated part, as the emergency brake lever, which is also connected to the brake mechanisms operated by said actuator by means permitting lost motion sufficient to operate the said separate valve mechanism, so that these brake mechanisms may also be operated either by the power of the actuator or by the physical force of the operator, or both, independently of the operation of the other brake mechanisms, and independently of the first mentioned controlling valve mechanism connected with the foot pedal. Should more power be required to operate the less rugged brake mechanisms than can be conveniently obtained from the physical force of the operator, we may interpose in the connections between the foot lever and the brake mechanisms connected therewith, another power actuator of such capacity that its maximum power may be exerted upon the brake mechanisms connected therewith without danger of injuring them, the valve mechanism for the first mentioned power actuator under the control of the foot pedal also controls such additional power actuator.

It will also be understood that our invention is applicable to installations in which the said separate sets of brake mechanisms operate upon the same wheels as where external brake mechanisms and internal brake mechanisms are applied to the brake drum or drums of a pair of wheels, or where one brake mechanism is applied to brake drums on the jack shafts and the other brake mechanism is applied to the brake drums on the wheels driven by said jack shaft, or where one set of brake mechanisms are applied to the drums carried by a pair of wheels and the other brake mechanism or mechanisms are applied to the brake drum or drums on the propeller shaft for driving said wheels, and also to installations in which the separate sets of brake mechanisms are applied to separate pairs of wheels. Our invention also comprises certain novel features of construction and combination of parts hereinafter fully described and particularly pointed out in the claims.

In all embodiments of our invention, the lever which is provided with locking means, usually the emergency lever, or hand brake lever, is connected with the valve mechanism and with the actuator which it controls, and the brake mechanism operated thereby, by means such as a slotted connection, which permits of the movement of the said valve mechanism, actuator and brake mechanism without moving the emergency lever when acting under the control of the valve mechanism connected with the other operator operated device, or foot pedal, to enable the said brake mechanism to be released by said valve mechanism and prevent it from being locked in applied position by the locking means (as pawl and segment) usually provided in connection with the emergency lever.

Our invention therefore provides means whereby the operator can, by means of one operator operated part, as the foot lever, apply the primary brake mechanisms by the power of an actuator and may also apply, and substantially simultaneously if desired, the secondary brake mechanisms by his physical force, or by another actuator, in which case he may apply his physical force to the secondary brake mechanism in addition to that of the actuator, or to operate such brake mechanism by physical force alone in case of failure of power, and the operator may, by operating another part, as the hand lever, apply the primary brake mechanism independently of the secondary brake mechanism, by power, and may apply his physical force thereto in addition to that of the actuator, or to operate said brake mechanisms in case of failure of power. It will also be seen that both sets of brake mechanisms can ordinarily be applied without the operator removing a hand from the steering wheel, and injury to the brake mechanisms themselves is practically obviated. In case of failure of power, either or both sets of brake mechanisms may be applied by the physical force of the operator.

We prefer to employ power actuators comprising a cylinder and a piston and operated by a differential of fluid pressures, the said fluid pressures being conveniently obtained by employing rarification obtained by a connection with the throttle controlled suction passage of an internal combustion engine, from the carburetor to the cylinders, between the throttle valve and the engine cylinders, as the lower fluid pressure, and air at atmospheric pressure, as the higher pressure fluid, but it is to be understood that we may employ higher pressure fluid at higher than atmospheric pressure, in which case the lower fluid pressure may be atmospheric or sub-atmospheric, as preferred. We also prefer to employ controlling valve mechanism for the actuator (or actuators) which will maintain the piston (or pistons) thereof subjected on both sides to the higher or to the lower fluid pressure when the parts are in released position, and where the suction from the suction passage of the engine is employed as the lower fluid pressure, both valve mechanisms are preferably so constructed that the piston of the actuator for the primary brake mechanism is maintained submerged in vacuum, so that whether operated by one valve mechanism or the other, to effect a power stroke, no air will be admitted to the suction passage of the engine. The actuator for the secondary brake mechanism, where employed, will likewise have its piston submerged in vacuum when the valve mechanism and the actuator and brake mechanism are in released position.

The pedal operated valve mechanism is also preferably constructed to provide a reactionary effect corresponding with the pressure exerted by the actuator (or actuators) controlled thereby, to enable the operator to "feel" and accurately regulate pressure which is being applied to the brake mechanisms by the actuator, or actuators.

Referring to the accompanying drawings,

Fig. 1 is a diagrammatic plan view of an automotive vehicle chassis provided with one form of brake system embodying our invention.

Fig. 1ᵃ is a side elevation of the internal combustion engine shown in Figs. 1, 4, 6, 8, and 11.

Fig. 5 is a sectional view of the secondary actuator shown in Fig. 4.

Figures 1, 1A, 5:
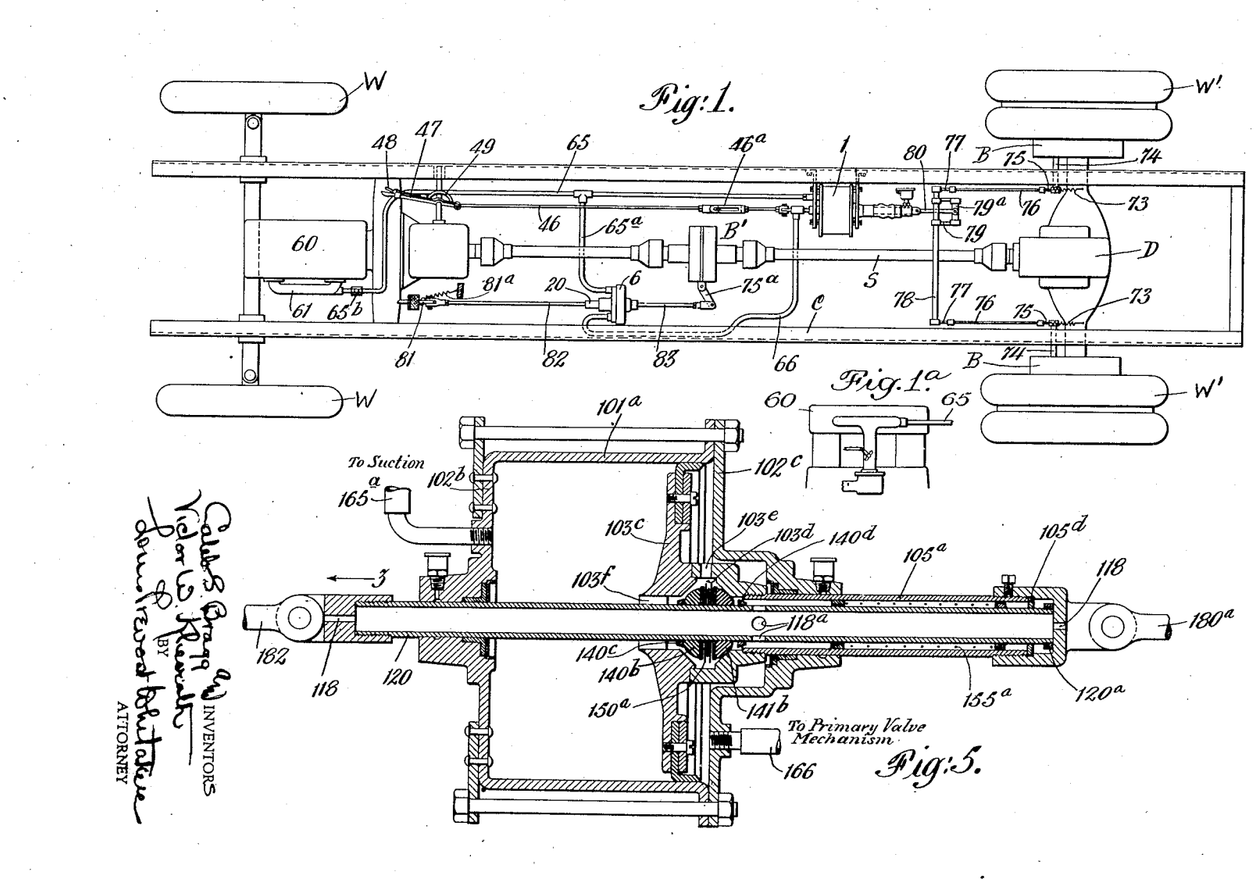
Figures 2, 3:
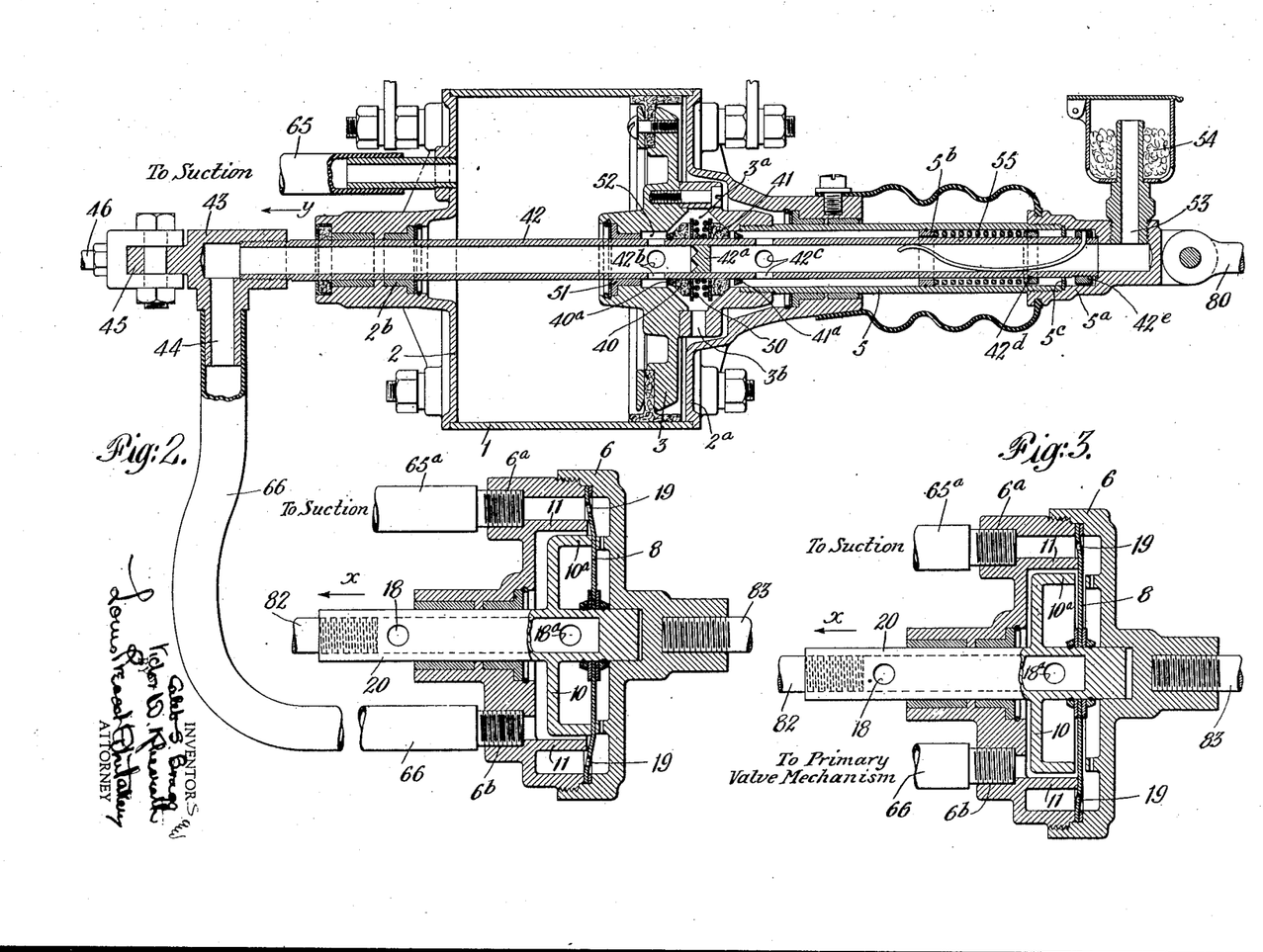
Fig. 2 is a sectional view of the power actuator illustrated in Fig. 1, and the controlling valve mechanism therefor.
Fig. 3 is a sectional view of the exterior valve mechanism shown in Figs. 1 and 2, in position to effect a power stroke of the actuator.

In the embodiment of our invention shown in Figs. 1, 2 and 3, C represents the chassis of an automotive vehicle, as a bus or truck, for example, provided with free wheels, indicated at W, W, and driven wheels, indicated at $W^1$, $W^1$, driven by an internal combustion engine, indicated at 60, through the usual propeller shaft, S, and differential gearing, D. In this instance the driven wheels, $W^1$, $W^1$, are provided with brake mechanisms, indicated at B, B, which may be of any desired type (internal brakes being indicated in Fig. 1) simultaneously operated by rock shafts, 74, provided with arms, 75, connected in this instance by links, 76, 76, with arms, 77, 77, on a coaxial rock shaft, 78, provided with equalizing draft arms, 79, 79, connected by a rod, $79^a$, to which power is applied to apply the brakes. The brakes, B, B, which will be termed the primary brake mechanisms, are preferably of more rugged construction than the other brake mechanisms with which the vehicle may be provided, which latter will be termed the secondary brake mechanisms.

1 represents the cylinder of a power actuator, preferably constructed as illustrated in detail in Fig. 2, said cylinder being closed at each end by a head, 2, $2^a$, and provided with a piston, 3, having a hollow piston rod, 5, connected by a link, 80, with the rod, $79^a$, for applying the primary brakes. The brakes are provided with the usual retracting springs for effecting their release and the return of the piston. In this instance we have shown retracting springs, 73, 73, each connected at one end to one of the arms, 75, 75, and having its other end secured to a part of the chassis.

A valve mechanism which we term the primary valve mechanism adapted to be operated by the hand operated emergency brake lever is provided for the actuator, said valve mechanism being of any desired type, located in the connection between said hand lever and the brake mechanism operated by said power actuator, and may be conveniently located in the hub of the piston, which is provided with a valve chamber, $3^a$, communicating with the interior of the cylinder, 1, in rear of the piston, by a passage, or passages, $3^b$, said chamber being provided with oppositely disposed valves, 40 and 41, surrounding a valve actuating sleeve, 42, and normally pressed in a direction toward their seats at opposite ends of the valve chamber, $3^a$, by yielding means, as a spring, 50, interposed between said valves. 40 is the suction or lower pressure valve, and 41, is an air inlet or higher pressure valve, said valves being preferably formed of pressed or molded cork, cork composition, rubber, or other suitable material and engaging the sleeve, 42, with a sealing fit, and the sleeve is provided on opposite sides of said valves with collars, $40^a$ and $41^a$, so that one of said valves will be opened after permitting the other to seat by a longitudinal movement of the sleeve in either direction, the construction being such that both valves may be seated simultaneously. The sleeve, 42, extends through a sealing member, $2^b$, in the forward head of the cylinder, 1, and through a sealing member, 51, in the forward end of the piston hub, and through the piston, 3, and the hollow piston rod, 5, and said sleeve is provided at its forward end with a fitting, 43, having a pipe connection, 44, communicating with the interior of the sleeve, and an attaching lug, 45, connected by a link, 46, with the hand operated brake lever, 47, mounted pivotally on the chassis and provided with the usual locking lever, 48, and segment, 49. The link, 46, is provided with a slotted connection, indicated at $46^a$, or equivalent device, permitting the valve actuating sleeve to move forward with the piston, without moving the hand lever, while permitting the sleeve to be drawn forward by a movement of the hand lever.

The sleeve, 42, is provided with a plug or partition, $42^a$, separating the forward portion from the rear portion, and the forward portion of the sleeve communicates by an aperture, or apertures, $42^b$, with a suction chamber, 52, forward of the valve chamber, $3^a$, and communicating therewith when the suction valve, 40, is open. The sleeve, 42, is also provided in rear of the plug, $42^a$, with an aperture, or apertures, $42^c$, communicating with the space between said sleeve and the hollow piston rod, which forms a higher pressure inlet chamber, and is in communication with the valve chamber, 3ᵃ, when the inlet valve, 41, is opened. The outer end of the hollow piston rod is provided with an inlet, 53, for the higher pressure fluid (in this instance atmospheric air) and said inlet is conveniently provided with an air strainer, indicated at 54. The air inlet is shown as provided in a cap, 5ᵃ, secured to the end of the piston rod, and provided with an attaching lug to which the link, 80, is attached.

The sleeve, 42, is provided with yielding retracting means for holding the valve, 41, closed, and suction valve, 40, open, when the parts are in released position, and in this instance we have shown a spring, 55, surrounding the sleeve, 42, and located between a collar, 5ᵇ, on the interior of the piston rod, 5, and a collar, 42ᵈ, on the exterior of the sleeve, 42. The movement or lost motion between the sleeve, 42, and the piston, 3, is limited in one direction by the engagement of the end of the sleeve with the rear end of a recess in the cap, 5ᵃ, and in the opposite direction by the engagement of a collar, 42ᶜ, on the sleeve, with a collar, 5ᶜ, connected with the piston rod. As shown in Fig. 2, the spring, 55, holds the sleeve, 42, in position to open the suction valve, 40, when the parts are in released position, thus placing the forward end of sleeve, 42, in communication with the cylinder, 1, in rear of the piston.

The actuator cylinder, 1, forward of the piston, is connected at all times with the source of lower fluid pressure, and in this instance is shown connected by a suction pipe, 65, with the intake manifold, 61, of the internal combustion engine, 60, thus connecting it with the suction passage from the carburetor between the throttle valve and the engine cylinders. It will be understood that the intake manifold is connected with a carburetor by the usual vertical passage in which the throttle valve is located, but these parts are so well understood that we have not illustrated them herein.

In Fig. 1 we have shown the propeller shaft, S, provided with brake mechanism, B¹, of any usual or preferred construction, herein termed the secondary brake mechanism, of which, 75ᵃ, represents the operating lever, 81, represents a pedal lever mounted on the chassis, and connected with the brake lever by linkage, in which is located the secondary valve mechanism for the actuator for the primary brake mechanism, which valve mechanism is exterior to and movable with respect to the actuator cylinder, 1. The secondary valve mechanism may be of any desired type, and is preferably so constructed as to provide a reactionary feature whereby the initial resistance offered to the foot of the operator in operating the valve mechanism to effect a power stroke of the actuator, will be increased substantially in proportion to the power exerted by the actuator on the primary brake mechanism, so as to enable the operator to determine by the increased resistance necessary to hold the valve mechanism in position to effect or hold a power stroke of the actuator, the degree of power which is being exerted by the actuator upon the brake mechanism connected therewith. If the reactionary type of valve is used, the force of the driver exerted to overcome the resistance of the valve is transmitted through the valve to the secondary brake, B¹, to apply said brake proportionately, but to a predetermined lesser degree than the power brakes. This valve mechanism is shown in this instance as being of the same construction as that shown in our former application for Letters Patent of the United States, Serial No. 231,724, filed November 7th, 1927. The particular construction of this valve mechanism, which is illustrated in Figs. 2 and 3, is not claimed herein, and it will be described only sufficiently to enable the operation to be clearly understood. This exterior valve mechanism comprises a hollow casing, indicated at 6, provided with a suction or low pressure aperture, 6ᵃ, and an aperture, 6ᵇ, adapted to be connected with the actuator or actuators, to be controlled, in rear of the piston or pistons thereof. The valve casing has an interior annular seat, 11, adapted to be engaged by a diaphragm, 8, having its marginal portions in sealing engagement with the valve casing, the said diaphragm being provided with an aperture, or apertures, 19, outside of the seat, 11, communicating with the suction aperture. Within the valve casing is a cup-shaped disc valve, 10, having an annular flange, 10ᵃ, for engaging the diaphragm to make an air tight connection therewith, the disc valve being rigidly connected with a hollow sleeve, 20, provided with an inlet aperture, 18, for air or other higher pressure fluid outside of the valve casing, and a communicating aperture, 18ᵃ, within the space between the disc valve and the diaphragm. Briefly stated, when the valve is in its released position, as shown in Fig. 2, the disc valve is pressed against the diaphragm, and presses the diaphragm away from the seat, 11, thus connecting the cylinder aperture, 6ᵇ, with the suction aperture, 6ᵃ. In this position of the valve mechanism, fluid pressures on the diaphragm and disc valve will be substantially equalized, as the air or higher pressure fluid between the disc valve and diaphragm is exerted equally in opposite directions on said parts, which are surrounded by rarification, or in other words, the lower fluid pressure. The movement of the sleeve, 20, in the direction of th arrow, x, Figs. 2 and 3, will permit the diaphragm to seat on the annular seat, 11, closing off communication between the suction aperture, 6ᵃ, and cylinder aperture, 6ᵇ, after which the disc valve will move away from the diaphragm, as shown in Fig. 3, and establish communication between the atmosphere or other source of higher fluid pressure, and the cylinder aperture, 6ᵇ. As the pressure builds up in the cylinder in rear of the piston, it will build up correspondingly within the valve casing and gradually reduce the differential of fluid pressures on opposite faces of the disc valve, 10, while the differential of fluid pressures on the diaphragm remains the same, and is gradually transferred to the operator operated part, or foot lever, as the equalizing differential of fluid pressures on the disc valve decreases, thus adding to the initial resistance furnished by a retracting spring, hereinafter referred to, in proportion to the differential of fluid pressures in the actuator cylinder, and enabling the operator to determine accurately the extent to which the power of the actuator piston is being applied to the brake mechanism connected therewith. It will be seen that a further forward movement of the sleeve, 20, in the direction of the arrow, x, will bring the disc valve, 10, into engagement with the front wall of the casing, 6, and permit the operator to apply more of his physical force than was applied in overcoming the reaction of the valve through the valve mechanism and linkage to the secondary brake mechanism connected therewith.

As shown in Figs. 1 and 2, the suction aperture, 6ᵃ, of the secondary controlling valve mechanism just described, is connected with the suction passage of the engine, in this instance by a suction pipe, 65ᵃ, which communicates with the main suction pipe, 65. The cylinder aperture, 6ᵇ, of the secondary valve mechanism is connected by a pipe, 66, with the cylinder to the rear of the piston, under the control of the primary valve mechanism controlled by the emergency brake lever, in this instance with the connection, 44, communicating with the hollow valve actuating sleeve, 42, of the power actuator, as clearly shown in Figs. 1 and 2, the pipes, 66 and 65ᵃ, being flexible, to permit of the longitudinal movement of the valve mechanism. The valve casing, 6, and the valve actuating sleeve, 20, of the secondary valve mechanism are connected, the one with the foot pedal lever, and the other with the brake operating lever, 75ᵃ, of the secondary brake mechanism. In this instance the valve casing is connected by a link rod, 83, to the lever, 75ᵃ, and the valve actuating sleeve, 20, is connected by a link rod, 82, with the pedal lever, 81. The foot lever is also provided with a retracting spring, 81ᵃ, shown at one side of the link, 82, for greater clearness, which normally holds the main controlling valve mechanism in position, indicated in Fig. 2, which is the released position thereof.

The parts being in the position indicated in Figs. 1 and 2, it will be seen that, assuming that the engine is running and the throttle valve is closed, the air will be exhausted from the actuator cylinder, 1, forward of the piston, through the suction pipe, 65, and likewise, the air will be exhausted from the cylinder, 1, in rear of the piston through the passage, or passages, 3ᵇ, in the piston, the valve chamber, 3ᵃ, suction chamber, 52, hollow sleeve, 42, suction pipe, 66, valve casing, 6, and suction pipe, 65ᵃ, the piston of the actuator being, therefore, as we term it, maintained submerged in the lower fluid pressure, or in this instance, vacuum. In normal braking, the operator will place his foot on the pedal lever and depress it. In so doing, he has only to overcome the initial resistance of the retracting spring, 81ᵃ, since the fluid pressures on the diaphragm, 8, and disc valve, 10, are substantially equal, as before stated. The movement of the secondary valve mechanism by the pedal lever, to the position shown in Fig. 3, will, as before stated, permit the diaphragm, 8, to close upon its seat, 11, after which the disc valve moves away from the diaphragm, thus disconnecting the cylinder, 1, in rear of the piston from the suction passage, and admitting air or other higher pressure fluid thereto, through the inlet aperture, 18. This effects a movement of the piston, 3, in the direction of the arrow, y, Fig. 2, the sleeve, 42, moving with the piston, and the movement of the piston will apply the primary brake mechanisms, B, B. As the pressure in rear of the piston increases, the pressure will likewise increase within the valve casing on the forward side of the diaphragm, the rear face of which is still exposed to suction or lower pressure by reason of apertures, 19, and this pressure tends to move the diaphragm in a direction opposite that of the arrow, x, thus increasing the initial resistance to the foot of the operator through the pedal lever, in substantial proportion to the pressure exerted by the actuator on the primary brake mechanisms, and enabling the operator, who must overcome this gradually increasing resistance in order to keep the disc valve in open position, to accurately determine the amount of pressure applied to the brakes by the actuator. The corresponding pressure on the valve casing, 6, will tend to move it in the direction of the arrow, x, and apply the secondary brake, B¹, with a force in proportion to the force exerted by the piston, 3, of cylinder, 1. If a comparatively small amount of braking pressure is required, the primary brake mechanisms only may be thus partially applied, but as greater braking is desired, the brake, B¹, will be applied by the reaction of the valve mechanism until the operator depresses the pedal sufficiently to not only move the disc valve away from the diaphragm, but also move it into contact with the valve casing, thus taking up the lost motion between the pedal lever and the secondary brake mechanism, and enabling him, by a further forward movement of the pedal lever to apply the secondary brake mechanism, B¹, in this instance located on the propeller shaft, substantially simultaneously with the application of the primary brake mechanisms, or as will be readily seen, the primary brake mechanisms may be first fully applied by the power actuator, and the secondary brake mechanisms applied thereafter under the control of the operator, through the pedal lever. The operator may also hold the primary brake mechanisms as applied, by stopping the forward movement of the foot pedal and permitting the valve casing, which is moved forward by the pressure on its rear face and applying brake, B¹, to seat the disc valve upon the seat, 11, and when the foot pedal is sufficiently depressed to bring the disc valve, 10, into engagement with the diaphragm, 8, without unseating the diaphragm from the seat, 11. To release the brake mechanisms, the operator will remove his foot from the brake pedal, or release it gradually as preferred, permitting the retracting spring, 81ª, to move the pedal lever rearwardly, restoring the valve mechanism to the released position, shown in Fig. 2, which disconnects the cylinder, 1, in rear of the piston from the source of higher pressure, and reconnects it with the suction passage of the engine, thereby withdrawing the air previously admitted for the power stroke of the piston. Air exhausted into the suction pipe, 65, reduces the degree of rarification therein, and while some air is withdrawn into the intake manifold in such quantities as will not stall the motor if idling, the remaining air is withdrawn into the forward end of the cylinder to equalize pressures within the cylinder and permit a quicker release of the brakes than could be obtained if all air had to be withdrawn into the intake manifold of the engine before pressures within the cylinder were equalized. The remaining air is subsequently withdrawn into the intake manifold. The primary brakes will immediately release themselves under the action of their retracting means, as the springs, 73, which will return the brake mechanism and the piston, 3, to the released position, and the piston will remain submerged in vacuum, as before described. It will be understood that when air is admitted in rear of the piston to effect the power stroke of the piston, this will be accomplished without admitting any air to the suction passage during the application of the brake mechanism, as the portion of the cylinder forward of the piston is at all times in communication with the suction pipe, 65, so that there will be no danger of stalling the engine if idling during the application of the brake mechanism. It will also be understood that the power stroke of the piston is effected without operating the hand lever, 47, by reason of the slotted connection, 46ª, previously described.

The primary brake mechanism alone may also be applied by means of the hand lever, 47. If the operator grasps this hand lever and pulls it toward him, the valve sleeve, 42, of the primary valve mechanism will be moved in the direction of the arrow, y, Fig. 2, thereby closing the suction valve, 40, and thereafter opening the air or higher pressure inlet valve, 41. The closing of the suction valve, 40, disconnects the cylinder in rear of the piston from the suction passage through the secondary valve mechanism, and the admission of air in rear of the piston through the port 53 upon the opening of the valve, 41, will effect a power stroke of the piston and will apply the primary brake mechanisms, B, B. In operating the lever, 47, the operator will overcome the initial resistance of the retracting spring, 55, and must continue to draw the lever, 47, rearwardly, as the piston moves forwardly, in order to keep the sleeve, 42, in position, with respect to the piston, to hold the valve, 40, closed and the valve, 41, open. As soon as the movement of the hand lever, 47, ceases, a slight continued forward movement of the piston will cause it to shift with respect to the valve actuating sleeve, sufficiently to close the inlet valve, 41, without opening the suction valve, thus holding the primary brakes as applied, and the hand lever may be locked in this position by the usual pawl and segment. The primary brakes are held as applied, as, should the pressures be reduced within the cylinder to the rear of the piston, the piston will be moved rearwardly by the draught of the applied brakes and their retracting means, and the air inlet valve, 41, would be opened to admit more air. Should the pressures rise, the piston would move forward and the suction valve open to reduce pressures. When the primary brakes have been fully applied by the actuator, as before described, the operator may apply his physical force to the primary brake mechanisms, B, B, by taking up the lost motion between the sleeve, 42, and the piston, and bringing the collar, 42ᵉ, into engagement with the collar, 5ᶜ, so that the operator can add his physical force to the primary brake mechanisms, in addition to the power exerted thereon by the actuator, and in case of failure of power, the operator can, by means of the hand lever, take up this lost motion between the sleeve, 42, and the piston, thereby placing the primary valve mechanism in position to vent the cylinder, and can apply the primary brake mechanisms, B, B, by physical force alone, for example, when the engine is not running, and can lock the brake mechanisms when so applied by means of the usual pawl and segment mechanism with which the hand lever is provided. It will also be seen that in case of failure of power the operator can also apply the secondary brake mechanism, by depressing the foot lever so as to bring the disc valve, 10, into engagement with the casing and applying his physical force directly to the secondary brake mechanism through the secondary valve mechanism and link rods, 82, 83.

Figures 4, 6, 7:
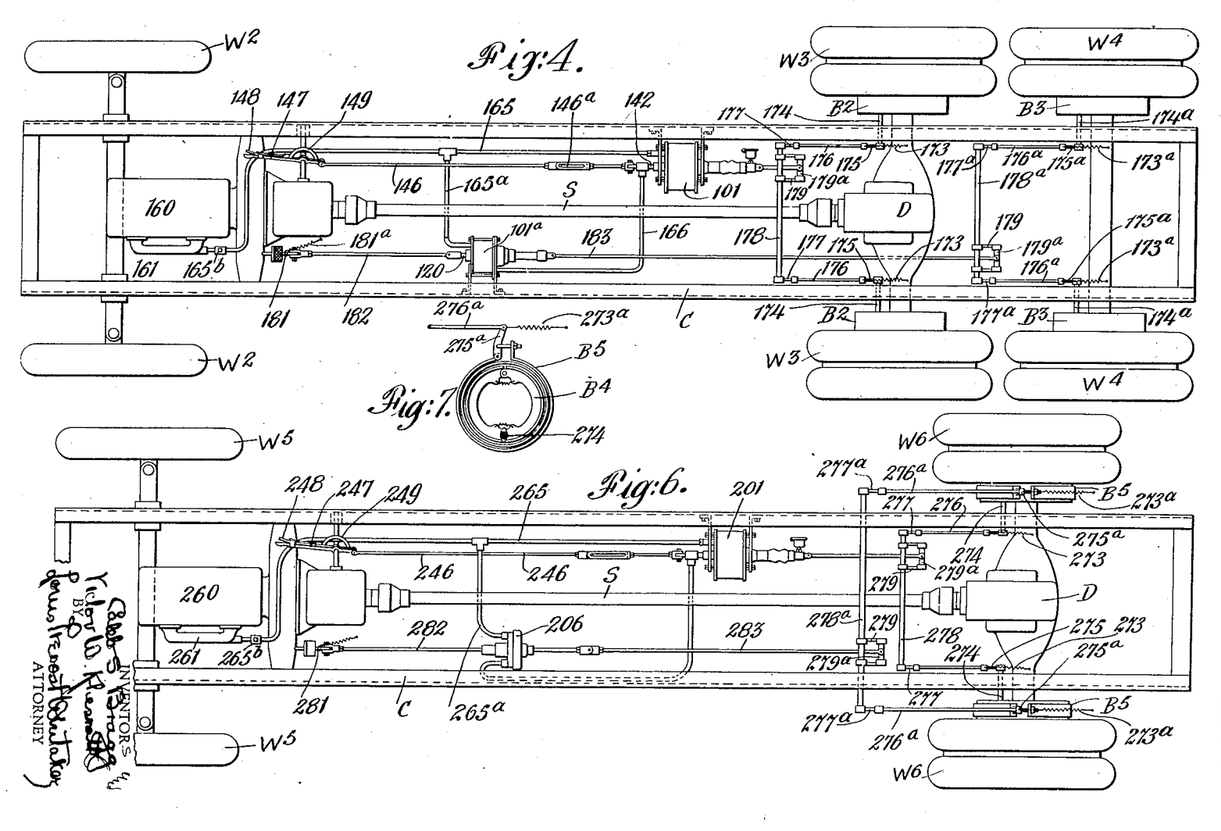
Fig. 4 is a view similar to Fig. 1, showing a modified embodiment of our invention.
Fig. 6 is a view similar to Fig. 1, showing another modified embodiment of our invention.
Fig. 7 is a detail view showing an internal and external brake mechanism applied to the same wheel as indicated in Fig. 6.

It will thus be seen that the embodiment of our improved brake system just described is very flexible and readily adapts itself to the requirements for braking power, as they may arise in the operation of the vehicle. The power actuator connected with the primary brake mechanism has its piston maintained in vacuum under the control of two separate valve mechanisms, one operated by the foot lever, which is also connected for operating a secondary brake mechanism simultaneously with or in addition to the primary brake mechanism, the other valve mechanism being under the control of a hand operated lever for independently operating the power actuator, and also permitting the operator to add his physical force when desired, or to apply the primary brake mechanism by physical force alone, in case of failure of power, at which time both primary and secondary brake mechanisms can therefore be applied by physical force to prevent an accident. It will also be seen that due to a constant maximum differential of pressures, the maximum vacuum always being constant, the construction of the actuator may be such that its maximum power will not injure the primary brake mechanism, and as in this embodiment the secondary brake mechanisms are applied by physical force of the operator, injury to the brake mechanisms cannot ordinarily occur by the application thereof beyond normal wear of the parts. Our brake system is particularly well adapted for trucks, buses, etc., since the primary brakes alone may be applied when the vehicle is lightly laden, either by the foot pedal, or hand lever, while both sets of brake mechanisms may be applied simultaneously, if desired, when the vehicle is heavily laden, and the full physical force of the operator's arm may be further added to that of his leg and to the power of the actuator whenever he pulls on the emergency brake lever and pushes upon the foot pedal lever, as in case of emergency or when otherwise desirable.

Where it is found desirable, the secondary valve mechanism may also control a secondary actuator for applying the secondary brake mechanisms, and may be a part of said actuator, if desired, and we have illustrated such a modification of our brake system in Fig. 4. It is also obvious that the secondary brake system, instead of being applied to the same identical wheels to which the primary brake mechanisms are applied, may be applied to another set of wheels of the vehicle, or preferably a second pair of non-steering wheels with which the vehicle may be provided for assisting in supporting the main portion of the weight of the vehicle, and this modification is also illustrated in Fig. 4. In this figure the parts corresponding with those previously described, are given the same reference characters with the addition of 100, for the purpose of avoiding repetition.

In this instance, the vehicle is shown as provided with steering wheels, $W^2$, $W^2$, a pair of driving wheels, $W^3$, $W^3$, and an additional pair of non-steering wheels, indicated at $W^4$, $W^4$. The driving wheels are provided with the primary brake mechanisms, $B^2$, $B^2$, connected with a primary actuator therefor, the cylinder of which is indicated at 101, in exactly the same manner as hereinbefore described, and constructed as shown in Fig. 2, and has its valve actuating sleeve, 142, connected with the hand lever, 147, by linkage, 146, containing the slotted connection, $146^a$, as previously described. In this instance we have shown the wheels, $W^4$, $W^4$, provided with the secondary brake mechanisms, indicated at $B^3$, $B^3$, operatively connected with a rock shaft, $178^a$, in the same manner that the brake mechanisms, $B^2$, $B^2$, are connected with the rock shaft, 178, the secondary brake mechanisms being in this instance adapted to be actuated ordinarily by a secondary power actuator, the preferred construction of which is indicated in section in Fig. 5. The secondary actuator comprises in this instance, a cylinder, $101^a$, closed at each end by heads, $102^b$, $102^c$, and provided with a piston, $103^c$, provided with a hollow piston rod, $105^a$, which is connected by a link, $180^a$, with the secondary brake mechanism. The secondary valve mechanism is in this instance located in the piston of the secondary actuator, and comprises the suction valve, $140^b$, and air inlet valve, $141^b$, located in a valve casing, $103^d$, in the piston, which communicates with the cylinder in rear of the piston by a passage, or passages, $103^e$, and with the cylinder forward of the piston by a passage, or passages, $103^f$. The valves, $140^b$, and $141^b$, are mounted on a valve actuating sleeve, 120, provided with collars, $140^c$ and $140^d$, for actuating said valves, which are normally pressed toward their seats by yielding means, $150^a$, and the sleeve, 120, in this instance communicates with the atmosphere or other higher pressure fluid by means of inlet apertures, 118, 118, which may be provided at each end of the sleeve, the sleeve being provided with apertures, $118^a$, communicating with the space within the hollow piston rod adjacent to the air valve, $141^b$. The valve sleeve is preferably provided with a retracting spring, $155^a$, and with a collar, $120^a$, adapted to engage a collar, $105^d$, on the hollow piston rod, to limit the lost motion between the sleeve and piston and permit the operator to apply his physical force to the piston, 103°, and the secondary brake mechanism connected therewith through the pedal lever, 181, which is connected with the sleeve, 120, by a link rod, 182. The forward end of the cylinder of the secondary actuator is connected with the suction pipe, 165, by a suction pipe, 165ª, and in this instance the portion of the cylinder in rear of the piston is connected by a pipe, 166, with the hollow sleeve, 142, of the primary actuator.

Assuming that the engine is running and the throttle closed, the air will be exhausted from the primary actuator cylinder, 101, forward of the piston, through the pipe, 165, and will also be exhausted from the secondary actuator, 101ª, forward of the piston through the pipe, 165ª. As the spring, 155ª, holds the sleeve, 120, of the secondary valve mechanism in position to maintain the suction valve, 140ᵇ, thereof open, and the inlet valve, 141ᵇ, closed, when the parts are in the released position, as shown in Fig. 5, the portion of the secondary actuator cylinder, 101ª, in rear of the piston will be in communication with the portion forward of the piston through the passages, 103ᵉ and 103ᶠ, so that the air in rear of the piston, 103°, will also be exhausted, and as this portion of the cylinder, 101ª, is connected by pipe, 166, with the hollow sleeve, 142, of the primary valve mechanism, which is in the position indicated in Fig. 2, the air will also be exhausted from the cylinder of the primary actuator in rear of the piston, so that both pistons will be maintained submerged in vacuum in the released positions. To apply the primary and secondary brake mechanisms, the operator will place his foot on the foot lever and depress it, thereby shifting the sleeve, 120, forward, in the direction of the arrow, z, in Fig. 5, opening the inlet valve, 141ᵇ, after permitting the closing of the suction valve, 140ᵇ, and admitting air or other higher pressure fluid to the cylinder, 101ª, in rear of the piston, which air is also transmitted through the pipe, 166, and sleeve, 142, of the primary actuator to the primary cylinder in rear of the piston. Both pistons will therefore move forward, substantially simultaneously, the piston of the primary actuator applying the primary brake mechanisms, and the piston of the secondary actuator applying the secondary brakes. In this case the operator may also apply his physical force to the secondary brake mechanisms in addition to the power of the actuator, by taking up the lost motion between the valve sleeve, 120, and the piston, 103°, as will be readily understood. As the piston, 103°, of the secondary actuator moves forward, the foot lever and valve actuating sleeve will move forward also, and when the forward movement of the operator ceases, the continuing forward movement of the piston, 103°, will shift it with respect to the valve sleeve, 120, sufficiently to permit the closing of the air inlet valve, 141ᵇ, without opening the suction valve, 140ᵇ, thus holding all of the brake mechanisms as applied. If the operator releases the brake pedal sufficiently to permit the sleeve, 120, to be retracted, and open the suction valve, 140ᵇ, there will be an immediate equalization of pressures within the secondary actuator, 101ª, and an accompanying equalization of pressures within the primary actuator, 101, permitting an immediate release of all the brake mechanisms, and the brakes will be returned, together with the pistons under the action of the retracting springs for the brake mechanisms to their released positions. Air will subsequently be withdrawn from both cylinders in such quantities as will not stall the engine if idling, as previously explained. It will also be understood that in case of failure of power, the operator, by depressing the foot pedal, can shift the valves of the secondary actuator into such position as to vent the cylinder thereof, and apply the secondary brake mechanism by physical force alone.

It will also be understood that, as in the construction illustrated in Figs. 1, 2 and 3, the primary brake mechanisms can be independently operated by the primary power actuator under the control of the primary valve mechanism operated by the hand lever, 147, and the physical force of the operator can be applied to the primary brake mechanism, in addition to the power of the primary actuator, or to shift the primary valve mechanism therein into position to vent the cylinder thereof, and apply the primary brake mechanisms by physical force alone, exactly as previously described with reference to Figs. 1, 2 and 3. It will be obvious that the physical force of the operator may be applied through both the primary and secondary valve mechanisms to the primary and secondary brake mechanisms if the operator uses his hand and leg on the operator operated parts 47 and 81, respectively.

In some instances the driving or non-steering wheels of the vehicle may be provided with interior and also exterior brake mechanism, and in Figs. 6 and 7 we have shown an installation corresponding exactly with that illustrated in Fig. 1, except that the non-steering wheels, W⁶, are provided with primary brake mechanisms, which are interior brake mechanisms, as indicated at B⁴, B⁴, operatively connected through a cross shaft, 278, with the power actuator, the cylinder of which is indicated at 201, constructed and operating in all respects as previously described, with respect to Figs. 1 and 3. The secondary brake mechanisms are in this instance exterior brake mechanisms, indicated at B⁵, B⁵, and are in like manner connected with a cross shaft, 278ª, which is operatively connected by linkage, 282 and 283, with the foot lever, 281, the secondary valve mechanism, the casing of which is indicated at 206, being the same as that illustrated in Figs. 1, 2 and 3. The other parts shown in Figs. 6 and 7 are identical with those previously described with reference to Figs. 1, 2 and 3, and are given the same reference numerals with the addition of 200, to avoid repetition, and the operation of the system shown in Figs. 6 and 7 is exactly the same as that previously described, with reference to Figs. 1, 2 and 3, except as above noted, and need not be repeated.

In the embodiments of our invention heretofore described, the power actuators have been of the type in which the pistons are normally maintained submerged in vacuum when in the released or retracted position, and we have shown these power actuators provided with valve mechanism located within the pistons thereof. It is to be understood, however, that our invention is equally applicable to brake systems in which power actuators are employed of the type in which the pistons are maintained submerged in atmosphere when in the released or retracted position, and it is also to be understood that the primary and secondary valve mechanisms for the actuators may be located exteriorly thereto.

Figures 8, 9, 10:
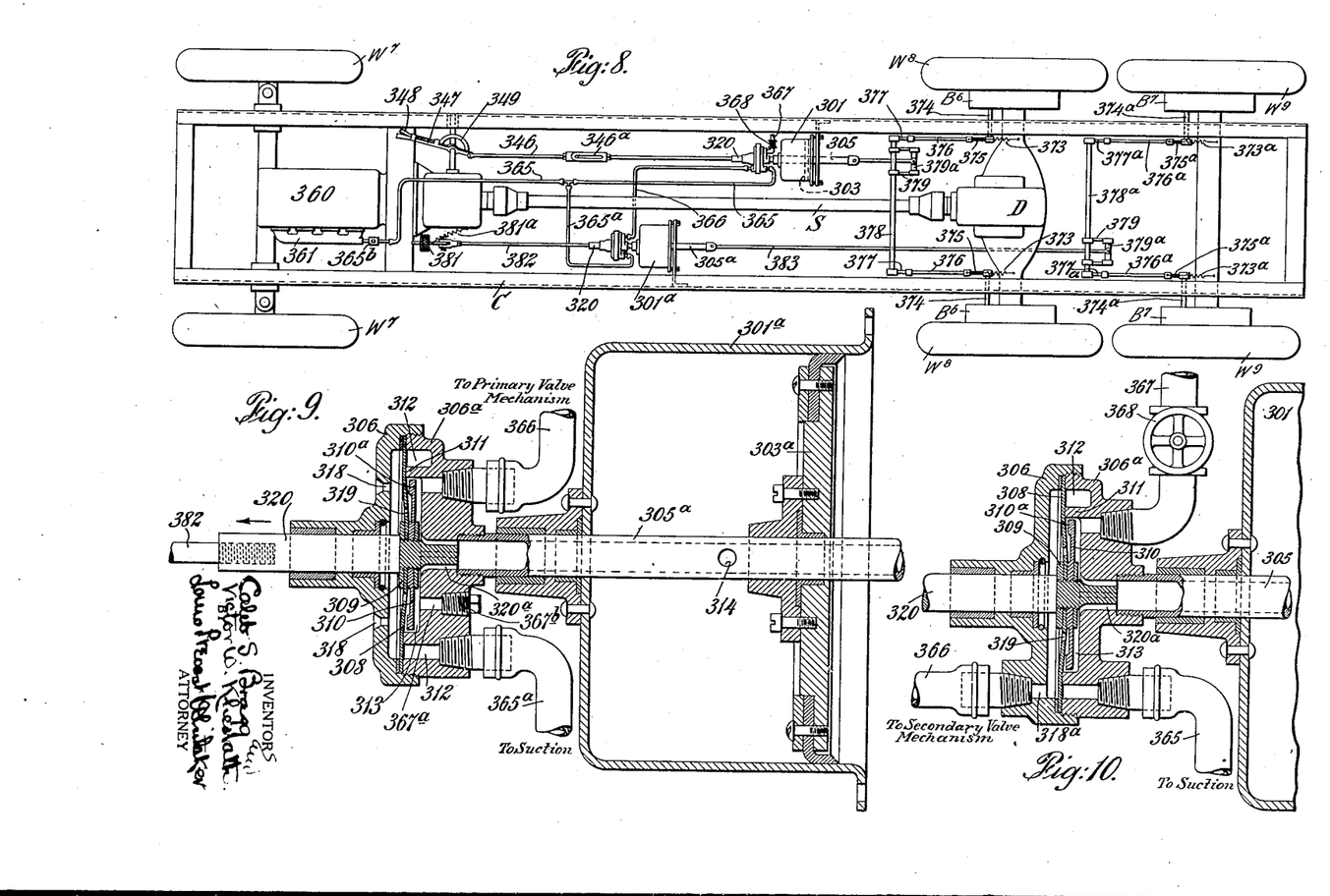
Fig. 8 is a view similar to Fig. 4, showing actuators of the type in which the piston is normally submerged in the higher fluid pressure, and in which the valve mechanisms are located exterior to the actuators.
Fig. 9 is an enlarged sectional view of the secondary actuator and the controlling valve mechanism connected therewith, and with the primary actuator.
Fig. 10 is a sectional view of the valve mechanism for the primary actuator shown in Fig. 8.

In Figs. 8, 9 and 10, we have shown an embodiment of our invention similar to that illustrated in Fig. 4, except that the primary and secondary power actuators, indicated at 301 and 301ª respectively, are of the type in which the piston is maintained submerged in atmosphere and the valve mechanisms are located exteriorly thereto, the other parts corresponding with those illustrated in Fig. 1 being given the same reference characters with the addition of 300 to avoid unnecessary description. In Fig. 8 the vehicle is shown as provided with steering wheels, W⁷, W⁷, a pair of driving wheels, W⁸, W⁸, and additional pair of non-steering wheels, indicated at W⁹, W⁹. The driving wheels are provided with primary brake mechanisms, indicated at B⁶, B⁶, connected with the piston of the primary actuator, 301, in the manner hereinbefore described, the wheels, W⁹, W⁹, being provided with secondary brake mechanisms, indicated at B⁷, B⁷, operatively connected with the piston of the secondary actuator, 301ª, in the manner previously described with reference to Fig. 4.

The secondary power actuator is illustrated in detail in Fig. 9, together with one form of secondary valve mechanism, the specific construction of which forms no part of our present invention as it is covered by our former application for patent, Serial No. 231,724, filed November 7, 1927. Referring to Fig. 9, the cylinder, 301ª, is closed at its forward end and open to the atmosphere at its rear end, and is provided with a piston, 303ª, a piston rod, 305ª, which is preferably hollow and extends through the forward end of the cylinder, and is provided within the cylinder with an aperture, 314. In this instance the exterior controlling valve mechanism is connected with the hollow piston rod, 305ª, and comprises a valve casing preferably formed in two parts, 306 and 306ª, connected by threaded portions, and clamping the marginal portions of a diaphragm between them. The rear portion, 306ª, of the valve casing is provided with an annular seat, 311, normally engaged by the diaphragm and dividing the rear portion of the valve casing into an annular suction chamber, 312, and a centrally located chamber, 313. The central portion of the diaphragm is sealingly connected with a valve actuating part, 320, which is also provided in rear of the diaphragm within the chamber, 313, with a disc valve, 310, having annular portions, 310ª, adapted to seat upon the inner face of the diaphragm when the valve actuating part is moved in the direction of the arrow, Fig. 9. The chamber, 313, is at all times in communication with the hollow piston rod and with the interior of the actuator cylinder, in this instance through longitudinal grooves, 320ª, in a guiding extension of the valve actuating part, 320. When the disc valve, 310, is in its retracted position out of contact with the diaphragm and the diaphragm is seated, the chamber, 313, and the actuator cylinder are placed in communication with the atmosphere through air inlet apertures, 319, in the diaphragm, and apertures, 318, in the casing member, 306.

The primary actuator cylinder, 301, is preferably constructed in the same manner as illustrated in Fig. 9, and the primary valve mechanism therefor which is illustrated in detail in Fig. 10 is constructed exactly like the valve mechanism illustrated in Fig. 9, except that the forward casing member, 306, is provided with a single aperture, 318ª, for the convenient attachment of a pipe connection thereto. The valve actuating part of each valve mechanism is provided with a part as a collar, 309, for engaging the casing member, 306, when the valve actuating part, 320, is drawn out to limit the relative movement between the part, 320, and the valve casing, to enable the operator to apply his physical force to the piston and the brake mechanism connected therewith. As shown in Fig. 8, the main suction pipe, 365, is connected with the suction chamber of the primary valve mechanism for the primary actuator, and is also connected by a branch pipe, 365ª, with the suction chamber of the secondary valve mechanism for the secondary actuator. The chamber, 313, of the secondary valve mechanism for the secondary actuator is connected by a pipe, 366, with the inlet aperture, 318ª, of the primary valve mechanism for the primary actuator. The corresponding aperture of the primary valve mechanism may be closed by a plug or otherwise, if no other actuators are to be controlled and coupled therewith, but in Figs. 8 and 10 we have shown an additional pipe, 367, connected with the chamber, 313, of the primary valve mechanism, which may be connected to another actuator, or actuators, which will operate under the control of either or both valve mechanisms, and said pipe is shown provided with a cut-off valve, 368, for closing it when this pipe connection is not used. It will also be understood that if it is desirable to have an additional actuator, or actuators, controlled by the secondary valve mechanism only, connected with cylinder, 301$^a$, this can be readily accomplished for example by providing the casing member, 306$^a$, of the secondary valve mechanism with an additional aperture, or apertures, communicating with the chamber, 313, to which a pipe similar to the pipe, 367, may be connected. We have shown an additional aperture in Fig. 9 at 367$^a$, in this instance closed by a plug, 367$^b$. This plug can be removed and an additional actuator or actuators connected with the secondary valve mechanism, if desired. In this instance the pedal lever, 381, is shown connected by link, 382, with the valve actuating part, 320, of the secondary valve mechanism, and the corresponding valve actuating part of the primary valve mechanism is connected by link, 346, having the lost motion connection, 346$^a$, previously described, with a hand lever, 347.

When the parts are in released position as shown in Figs. 8, 9 and 10, both actuator cylinders will be shut off from suction and will be placed in communication with the atmosphere through the inlet apertures, 318 and 319, of the secondary valve mechanism, as shown in Fig. 9. If the operator depresses the pedal lever, 381, the disc valve, 310, will be caused to seat upon the inner face of the diaphragm, cutting off both cylinders from the atmosphere, and the further movement of the pedal will move the diaphragm of the secondary valve mechanism away from its seat, 311, placing the chamber, 313, in communication with the suction passage of the engine, through the branch suction pipe, 365$^a$. The air within the cylinder, 301$^a$, will be exhausted through the hollow piston rod, and the air in the primary actuator cylinder, 301, will likewise be exhausted through its hollow piston rod and through the connecting pipe, 366, as the diaphragm of the primary valve mechanism shown in Fig. 10 will not have been moved from its released position. Both actuators may, therefore, be operated to apply all of the brake mechanisms substantially simultaneously by the operation of the secondary valve mechanism, and the operator may apply his physical force to the brake mechanisms, B$^7$, B$^7$. When the pedal, 181, is released, the secondary valve mechanism will be returned to its released position, reconnecting both actuator cylinders with the atmosphere, and permitting the brakes to release themselves and the pistons and brake mechanisms to return to the off or released position.

If the operator actuates the hand lever, 147, the primary valve mechanism shown in Fig. 10 will be operated, to first seat the disc valve on the inner face of the diaphragm, thereby disconnecting the actuator cylinder, 301, from the atmosphere through the connecting pipe, 366, and thereafter the diaphragm, 308, will be moved away from its seat, connecting the cylinder, 301, with the source of suction through the suction pipe, 365, withdrawing the air from the cylinder and applying only the brake mechanisms, B$^6$, B$^6$, connected with the piston of the primary actuator, to which the power of the operator may also be added through the hand lever, 347. As previously stated, when all of the brake mechanisms have been applied by power, the physical force of the operator can be added to the brake mechanisms, B$^7$, B$^7$, through the pedal lever, or to the brake mechanisms, B$^6$, B$^6$, through the hand lever or to both brake mechanisms at the same time, if desired. When the brakes are to be released, the operator will release the operator operated part and permit the valve mechanism, or mechanisms, which have been previously actuated, to return to the released position thereof, shown in Figs. 9 and 10, thus connecting the cylinder, 301, with the atmosphere through its valve mechanism, the connecting pipe, 366, and the secondary valve mechanism, which latter also connects the cylinder, 301$^a$, with the atmosphere, through the hollow piston rod, as previously described.

Figure 11:
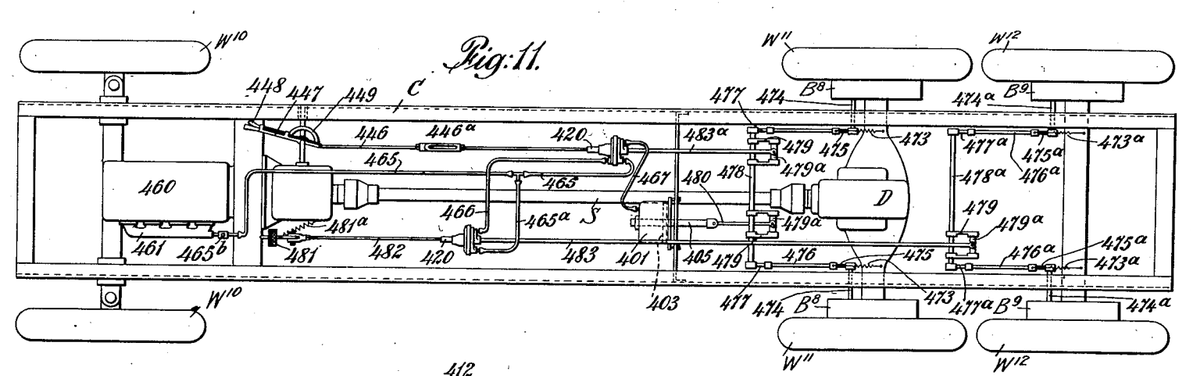
Fig. 11 is a view similar to Fig. 8, showing a further modification of our invention, in which the exterior valve mechanisms are located in linkage between the operator operated parts and certain of the brake mechanisms.
Figures 12, 13:
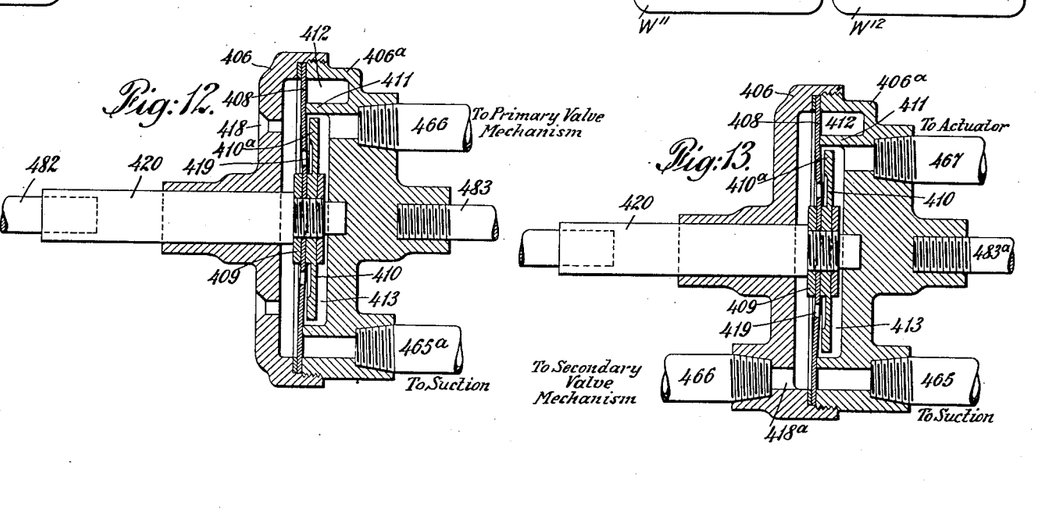
Fig. 12 is an enlarged sectional view of the secondary valve mechanism shown in Fig. 11.
Fig. 13 is a similar view of the primary valve mechanism shown in Fig. 11.

It is to be understood that the exterior valve mechanism need not necessarily be connected with the piston or pistons of the actuator or actuators, but may be connected in linkage between the operator operated part and the particular brake mechanisms to which the operator shall add his physical force as shown in Figs. 11, 12 and 13.

In these figures, parts corresponding with those illustrated in Figs. 1, 2 and 3, are given the corresponding reference numerals with the addition of 400 to avoid repetition. In Fig. 11 the automotive vehicle is shown provided with primary brake mechanisms, B$^8$, B$^8$, for the driving wheels, W$^{11}$, W$^{11}$; and secondary brake mechanisms, B$^9$, B$^9$, for the other non-steering wheels, W$^{12}$, W$^{12}$, as in Fig. 8. In this instance we have illustrated only one power actuator, the cylinder of which is shown at 401, provided with a piston, 403, a piston rod, 405, which is connected with the primary brake mechanisms by link, 480. The secondary valve mechanism illustrated in detail in Fig. 12 is constructed like that shown in Fig. 10, and previously described, except that the rear casing member, 406ª, has no central aperture and is connected by a link, 483, with the secondary brake mechanisms, B⁹, B⁹. The primary valve mechanism illustrated in detail in Fig. 13 is constructed exactly like that shown in Fig. 10, except that the rear casing member has no central aperture and is connected by a link rod, 483ª, with the rock shaft, 478, to which the power actuator is connected. The pipe connections are exactly the same as those previously described with reference to Figs. 8, 9 and 10, except that in this instance the primary valve mechanism has its chamber, 413, connected by pipe, 467, with the actuator cylinder, 401.

In this embodiment of our invention, when the operator depresses the foot lever, 481, the secondary valve mechanism will be operated to establish communication between the actuator cylinder and the branch suction pipe, 465ª, through the primary valve mechanism, as previously described with reference to Figs. 8, 9 and 10, to apply the brake mechanisms, B⁸, B⁸, by power, and by taking up the lost motion in the secondary valve mechanism, the operator can apply by physical force the secondary brake mechanisms, B⁹, B⁹. The operator can also operate the power actuator by the hand lever, 447, to apply the primary brake mechanisms, B⁸, B⁸, by power, and can also apply his physical force to said brake mechanisms in substantially the same manner as hereinbefore described with reference to Figs. 1, 2 and 3.

It will be understood that where valve mechanism of the type shown in Figs. 8 to 13 inclusive is connected directly to the piston or connected indirectly with the piston through the brake mechanism actuated by the piston, when the valve mechanism has been moved by the operator operated part and the movement of the operator operated part is stopped, the slight forward movement of the piston will effect a forward movement of the valve casing and restore the valve mechanism to a position in which the diaphragm is seated, to disconnect the actuator cylinder, or cylinders, from suction without unseating the disc valve from the diaphragm, thus holding the brakes as applied. It will also be understood that in this form of valve mechanism the differential of fluid pressures on the diaphragm of each valve will normally tend to hold the diaphragm upon its seat, and that when the valve mechanisms are actuated, there will be a gradually increasing differential of fluid pressures acting on the diaphragm in a direction to restore it to its released position, which will be transmitted to the operator operated part and increase the initial resistance to its movement by the operator in a manner similar to that described with reference to the valve mechanism illustrated in Figs. 2 and 3, so as to enable the operator, who must overcome this gradually increasing resistance, to accurately determine the amount of pressure applied to the brakes by the actuator, or actuators, controlled by the valve mechanism.

While we have shown our invention embodied in connection with actuators operated by the differential between atmospheric and sub-atmospheric pressures, it is obvious that pressures higher than atmospheric could be readily employed. For example, by connecting the higher pressure inlet aperture, 18, in Figs. 1 and 2, with a source of pressure fluid at higher than atmospheric pressure, as a tank of compressed air, for example, which tank may also be connected with the air inlet, 53, for the main valve mechanism.

What we claim and desire to secure by Letters Patent is:—

1. In a brake system for automotive vehicles, the combination with independently operable brake mechanisms, of a power actuator comprising a cylinder closed at both ends, and a piston therein, connections from said piston to certain of said brake mechanisms, a controlling valve mechanism for said actuator, means for directly connecting the said cylinder forward of the piston with the source of lower fluid pressure, means for connecting the said cylinder in rear of the piston with the sources of higher and lower fluid pressures under the control of said valve mechanism, a second controlling valve mechanism to connect the cylinder in rear of the piston with the sources of higher and lower pressures when the first mentioned valve mechanism is in released position, an operator operated part connected with said second valve mechanism and connected with certain of said brake mechanisms by means permitting sufficient lost motion to insure the operation of said valve mechanism, and a second operator operated part connected with said first mentioned valve mechanism, and connected with the brake mechanism operated by the actuator said connections providing sufficient lost motion to insure the operation of said valve mechanism.

2. In a brake system for automotive vehicles provided with an internal combustion engine having a throttle controlled suction passage from the carburetor to the engine cylinder, the combination with independently operable brake mechanisms, of a power actuator comprising a cylinder closed at both ends, and a piston therein, connections of said piston to certain of said brake mechanisms, a controlling valve mechanism for said actuator, means for connecting said cylinder, forward of the piston, with said suction passage between the throttle valve and the engine cylinders, means for connecting the cylinder in rear of the piston with said suction passage and with a source of higher fluid pressure, under the control of said valve mechanism, a second controlling valve mechanism constructed to connect the cylinder in rear of the piston with the suction passage of the engine and with said source of higher fluid pressure when the first mentioned valve mechanism is in released position, an operator operated part for said second valve mechanism operatively connected with certain of said brake mechanisms for controlling all of said brake mechanisms, and a separate operator operated part connected with the first mentioned valve mechanism and connected with the brake mechanisms operated by said actuator, said connections providing lost motion, sufficient to insure the operation of said valve mechanism.

3. In a brake system for automotive vehicles provided with an internal combustion engine having a throttle controlled suction passage from the carburetor to the engine cylinder, the combination with independently operable brake mechanisms, of a power actuator comprising a cylinder closed at both ends, and a piston therein, connections of said piston to certain of said brake mechanisms, a controlling valve mechanism for said actuator, means for connecting said cylinder, forward of the piston, with said suction passage between the throttle valve and the engine cylinders, means for connecting the cylinder in rear of the piston with said suction passage and with a source of higher fluid pressure, under the control of said valve mechanism, a second controlling valve mechanism constructed to connect the cylinder in rear of the piston with the suction passage of the engine and with said source of higher fluid pressure when the first mentioned valve mechanism is in released position, an operator operated part connected with said second valve mechanism and connected with other of said brake mechanisms by means permitting sufficient lost motion to insure the operation of said valve mechanism, and a second operator operated part connected with said first mentioned valve mechanism, and connected with the brake mechanisms operated by the actuator, said connections providing sufficient lost motion to insure the operation of said valve mechanism.

4. In a brake system for automotive vehicles, the combination with independently operable brake mechanisms, of a power actuator comprising a cylinder, a piston operatively connected with certain of said brake mechanisms, and controlling valve mechanism comprising a valve casing movable with the piston, and valves movable with respect to the piston, and a valve actuating part movable with and with respect to said piston and valve casing, an operator operated part connected with said valve actuating part, by means permitting movement of the piston without moving said operator operated part, locking means for said operator operated part, a second controlling valve mechanism for connecting said actuator cylinder on one side of the piston thereof with sources of higher and lower pressures, said pressures being under the control of either of said valve mechanisms, and a second operator operated part connected with said second valve mechanism and connected with other of said brake mechanisms, by means permitting lost motion sufficient to insure the operation of said second valve mechanism.

5. In a brake system for automotive vehicles provided with an internal combustion engine having a throttle controlled suction passage from the carburetor to the engine cylinder, the combination with independently operable brake mechanisms, of a power actuator comprising a cylinder closed at both ends, and a piston therein, connections from said piston to certain of said brake mechanisms, a controlling valve mechanism for said actuator, means for connecting said cylinder, forward of the piston, with said suction passage between the throttle valve and the engine cylinders, means for connecting the cylinder in rear of the piston with said suction passage and with a source of higher fluid pressure, under the control of said valve mechanism, a second controlling valve mechanism constructed to independently connect the cylinder in rear of the piston with the suction passage of the engine and with said source of higher fluid pressure, an operator operated part connected with said second valve mechanism and connected with other of said brake mechanisms by means permitting sufficient lost motion to insure the operation of said second valve mechanism, and a second operator operated part connected with said first mentioned valve mechanism, said second mentioned operator operated part being connected with the brake mechanism operated by said actuator, said connections providing sufficient lost motion to insure the operation of said first mentioned valve mechanism.

6. The combination with a power actuator comprising a cylinder, and a piston therein provided with means for connecting it with a part to be operated, of controlling valve mechanism for the actuator, for connecting the cylinder between the piston and a closed end of the cylinder with sources of higher and lower fluid pressures, an operator operated part for said valve mechanism, a second power actuator comprising a cylinder and a piston, a second controlling valve mechanism for connecting the cylinder of the second actuator between the piston and the closed end of the cylinder, and also the corresponding portion of the first mentioned actuator cylinder substantially simultaneously, with the sources of higher and lower pressures, and an independent operator operated part connected with said second valve mechanism, connections from the first mentioned operator operated part to the part operated by the first mentioned actuator, and connections between the second mentioned operator operated part and a part to be operated by the second actuator.

7. In a brake system for automotive vehicles provided with independently operable brake mechanisms, the combination with a power actuator comprising a cylinder, and a piston therein, operatively connected with certain of said brake mechanisms, controlling valve mechanism for said actuator, a second power actuator comprising a cylinder, a piston therein, operatively connected with other of said brake mechanisms, a second controlling valve mechanism, means for connecting the first actuator cylinder between a closed end thereof and the piston, with a source of higher fluid pressure, and with the second valve mechanism, under the control of the first mentioned valve mechanism, means for connecting the second mentioned actuator cylinder between the closed end thereof and the piston, with sources of higher and lower pressures, under the control of the second valve mechanism, for operating both actuators substantially simultaneously, means for holding the first mentioned valve mechanism, when in released position, in position to connect the second mentioned valve mechanism with the said portion of the cylinder of the first mentioned actuator, an operator operated part connected with the first valve mechanism, and operatively connected with the brake mechanisms operated by the first mentioned actuator, and an independent operator operated part connected with the second mentioned valve mechanism, and operatively connected with the brake mechanism operated by the second actuator.

8. In a brake system for automotive vehicles provided with an internal combustion engine having a throttle controlled suction passage from the carburetor to the engine cylinders, and independently operable brake mechanisms, the combination with a power actuator, comprising a cylinder closed at both ends, a piston in said cylinder, and operative connections therefrom to certain of said brake mechanisms, controlling valve mechanism for said actuator, a second power actuator comprising a cylinder closed at both ends, a piston in said actuator, operative connections from said piston to other of said brake mechanisms, a second controlling valve mechanism, and means including a tubular connection for connecting said valve mechanisms, means for connecting each of said actuator cylinders forward of the piston therein with the suction passage of the engine, said first mentioned valve mechanism being constructed to connect the cylinder of the first mentioned actuator with the second valve mechanism and with the source of higher fluid pressure, said second valve mechanism being constructed to connect the second actuator cylinder in rear of the piston and the corresponding portion of the first mentioned actuator with the suction passage of the engine and with the source of higher pressure, means for holding the first valve mechanism, when in released position, in position to connect the first actuator cylinder in rear of its piston, with the second valve mechanism, means for holding said second valve mechanism, when in released position, in position to connect the portion of the second actuator in rear of its piston and the corresponding portion of the first mentioned actuator with the suction passage of the engine, to maintain both pistons submerged in vacuum, an operator operated part connected with the first mentioned valve mechanism and connected with the brake mechanism operated by the first mentioned actuator, and a separate operator operated part connected with the second mentioned valve mechanism and operatively connected with the brake mechanism operated by the second actuator.

9. In a brake system for automotive vehicles, the combination with a power actuator comprising a cylinder and a piston, means for connecting said piston with brake mechanism of the vehicle, two separate and independently operable valve mechanisms for independently controlling said actuator, means for connecting the actuator cylinder between the piston and a closed end of the cylinder with sources of higher and lower pressures under the control of either of said valve mechanisms, one of said valve mechanisms being connected with and movable with the actuator piston, and being provided with parts movable with respect to said piston, an operator operated part connected with said movable parts of said valve mechanism, and an independent operator operated part for operating the other of said valve mechanisms.

10. In a brake system for automotive vehicles, the combination with a power actuator comprising a cylinder and a piston, means for connecting said piston with brake mechanism of the vehicle, two separate and independently operable valve mechanisms for independently controlling said actuator, means for connecting the actuator cylinder between the piston and a closed end of the cylinder with sources of higher and lower pressures under the control of either of said valve mechanisms, an operator operated part, one of said valve mechanisms being connected with and movable with the actuator piston, and connected to said operator operated part, operatively connected by means providing lost motion with brake mechanism operated by said actuator, and an independent operator operated part for the other of said valve mechanisms.

11. In a brake system for automotive vehicles, the combination with a power actuator comprising a cylinder and a piston, means for connecting said piston with brake mechanism of the vehicle, two separate and independently operable valve mechanisms for independently controlling said actuator, means for connecting the actuator cylinder between the piston and a closed end of the cylinder with sources of higher and lower pressures under the control of either of said valve mechanisms, one of said valve mechanisms being connected with and movable with the actuator piston, an operator operated part for said valve mechanism, operatively connected by means providing lost motion with brake mechanism operated by said actuator, an independent operator operated part for the other of said valve mechanisms, and operative connections between said operator operated part and other brake mechanisms of the vehicle.

12. In a brake system for automotive vehicles, the combination with a power actuator comprising a cylinder and piston, means for connecting the said piston with certain brake mechanisms of the vehicle, controlling valve mechanism for said actuator provided with relatively movable parts, an operator operated part, connections from the respective relatively movable parts of said valve mechanism to said operator operated part and to the brake mechanism connected with said actuator, a second controlling valve mechanism for the actuator, having relatively movable parts, a second operator operated part, the movable parts of said second valve mechanism connected respectively to the said second operator operated part and to brake mechanism of the vehicle, each of said valve mechanisms being provided with means for limiting the relative movement of its relatively movable parts.

13. In a brake system for automotive vehicles, the combination with a primary actuator comprising a cylinder and piston, connections from said piston to certain brake mechanisms of the vehicle, primary controlling valve mechanism for said primary actuator, an operator operated part for said valve mechanism, a secondary power actuator comprising a cylinder and piston, connections from said piston to other brake mechanisms of the vehicle, a secondary controlling valve mechanism for controlling both of said actuators, and a separate operator operated part for said secondary controlling valve mechanism, said first mentioned operator operated part being operatively connected with the brake mechanism operated by the primary actuator, and the other of said operator operated parts being operatively connected with the brake mechanisms operated by said secondary actuator.

14. In a brake system for automotive vehicles, the combination with primary and secondary actuators, each comprising a cylinder and piston, connections from the primary actuator to certain brake mechanisms, connections from the piston of the secondary actuator to other brake mechanisms, a primary controlling valve mechanism for the primary actuator comprising parts operatively connected with the piston thereof and relatively movable parts, an operator operated part, connections therefrom to said relatively movable parts of said valve mechanism, a secondary controlling valve mechanism operatively connected with both actuators for operating the same substantially simultaneously, and comprising parts operatively connected with the piston of said secondary actuator and movable therewith, and relatively movable parts, a second operator operated part, connections therefrom to said relatively movable parts of said secondary controlling valve mechanism, and means for limiting the relative movement of the parts of each valve mechanism.

15. In a brake system for automotive vehicles, provided with an internal combustion engine having a throttle controlled suction passage from the carburetor to the engine cylinders, and independently operable brake mechanisms, the combination with a power actuator comprising a cylinder closed at both ends, a piston in said cylinder, operative connections from said piston to certain of said brake mechanisms, a controlling valve mechanism for the actuator connected with the cylinder in rear of the piston, means for connecting the cylinder forward of the piston at all times with the suction passage of the engine between the throttle valve and the engine cylinder, a second valve mechanism for the actuator, means including a tubular connection for placing said second valve mechanism in communication with the first mentioned valve mechanism, means for placing the cylinder in rear of the piston in communication with the second mentioned valve mechanism, and with a source of higher fluid pressure under the control of the first mentioned valve mechanism, said second valve mechanism serving to connect the first valve mechanism with the suction passage of the engine and with a source of higher fluid pressure, means for holding said first mentioned valve mechanism, when in released position, in position to connect said portion of the cylinder with the second valve mechanism, an operator operated part connected with the first mentioned valve mechanism, and operatively connected with the brake mechanisms operated by the actuator, and an independent operator operated part connected with the second valve mechanism, and operatively connected with other of said independently operable brake mechanisms.

16. In a brake system for automotive vehicles, provided with an internal combustion engine having a throttle controlled suction passage from the carburetor to the engine cylinders, and independently operable brake mechanisms, the combination with a power actuator comprising a cylinder closed at both ends, a piston in said cylinder, operative connections from said piston to certain of said brake mechanisms, a controlling valve mechanism for the actuator connected with the cylinder in rear of the piston, means for connecting the cylinder forward of the piston at all times with the suction passage of the engine between the throttle valve and the engine cylinder, a second valve mechanism for the actuator, means including a tubular connection for placing said second valve mechanism in communication with the first mentioned valve mechanism, means for placing the cylinder in rear of the piston in communication with the second mentioned valve mechanism, and with a source of higher fluid pressure under the control of the first mentioned valve mechanism, said second valve mechanism serving to connect the first valve mechanism with the suction passage of the engine and with a source of higher fluid pressure, means for holding said first mentioned valve mechanism, when in released position, in position to connect said portion of the cylinder with the second valve mechanism, and means for holding said second mentioned valve mechanism, when in released position, in position to connect said portion of the actuator cylinder through the first mentioned valve mechanism, with the suction passage of the engine to maintain the piston submerged in vacuum, an operator operated part connected with the first mentioned valve mechanism and operatively connected with the brake mechanism connected therewith, and an independent operator operated part for said second valve mechanism, operatively connected with other of said independently operable valve mechanisms.

In testimony whereof we affix our signatures.

CALEB S. BRAGG.
VICTOR W. KLIESRATH.